United States Patent
McIntyre et al.

(10) Patent No.: US 10,869,348 B1
(45) Date of Patent: Dec. 15, 2020

(54) MULTI-USER TIME TRACKING MESH NETWORK

(71) Applicant: Intuit Inc., Mountain View, CA (US)

(72) Inventors: Nathan A. McIntyre, Eagle, ID (US); Devin Shively, Eagle, ID (US); Joshua Andrew Yundt, Eagle, ID (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/502,851

(22) Filed: Jul. 3, 2019

(51) Int. Cl.
| | |
|---|---|
| *H04W 76/11* | (2018.01) |
| *H04W 76/14* | (2018.01) |
| *H04W 76/40* | (2018.01) |
| *H04W 84/18* | (2009.01) |
| *H04W 88/04* | (2009.01) |
| *H04W 8/18* | (2009.01) |
| *H04W 48/16* | (2009.01) |
| *H04W 8/26* | (2009.01) |
| *H04W 60/00* | (2009.01) |
| *H04W 8/00* | (2009.01) |

(52) U.S. Cl.
CPC .......... *H04W 76/14* (2018.02); *H04W 8/005* (2013.01); *H04W 8/18* (2013.01); *H04W 8/265* (2013.01); *H04W 48/16* (2013.01); *H04W 60/00* (2013.01); *H04W 76/11* (2018.02); *H04W 76/40* (2018.02); *H04W 84/18* (2013.01); *H04W 88/04* (2013.01)

(58) Field of Classification Search
CPC ....... H04W 76/40; H04W 8/005; H04W 8/18; H04W 8/265; H04W 48/16; H04W 60/00
See application file for complete search history.

(56) References Cited

U.S. PATENT DOCUMENTS

| | | | |
|---|---|---|---|
| 9,628,956 B1 | 4/2017 | Kim | |
| 2014/0143040 A1* | 5/2014 | Takahashi | G06Q 30/0226 705/14.27 |
| 2015/0095171 A1* | 4/2015 | Morgan | G06Q 10/105 705/16 |

(Continued)

FOREIGN PATENT DOCUMENTS

WO    WO 2017/011896    1/2017

OTHER PUBLICATIONS

International Search Report dated Sep. 21, 2020 issued in International Application No. PCT/US2020/035631, filed Jun. 2, 2020.

(Continued)

*Primary Examiner* — Asad M Nawaz
*Assistant Examiner* — Syed Ali
(74) *Attorney, Agent, or Firm* — DLA Piper LLP (US)

(57) ABSTRACT

A transceiver of a mobile device may receive a beacon transmitted by a mesh network member mobile device. A processor of the mobile device may extract a crew ID from the beacon. The processor may determine that the crew ID matches a crew ID of a user logged into the mobile device. In response to determining that the crew ID matches the crew ID of the user, the processor may generate a reply beacon. The transceiver may transmit the reply beacon. The transceiver may receive a response to the reply beacon. The response may include a job ID enabling the user to clock into a job. The processor may clock the user into the job. As a result of clocking the user into the job, the mobile device may become a member of the mesh network.

8 Claims, 14 Drawing Sheets

(56) References Cited

U.S. PATENT DOCUMENTS

| | | | |
|---|---|---|---|
| 2015/0363745 A1* | 12/2015 | Hatch | G06Q 10/1091 |
| | | | 705/32 |
| 2016/0203522 A1* | 7/2016 | Shiffert | H04W 4/021 |
| | | | 705/14.58 |
| 2016/0203530 A1* | 7/2016 | Shaaban | G09C 1/00 |
| | | | 705/38 |
| 2016/0217428 A1* | 7/2016 | Shaaban | G06Q 30/04 |
| 2017/0083848 A1* | 3/2017 | Edelman | G06Q 30/0641 |
| 2018/0046988 A1 | 2/2018 | Kim | |
| 2018/0130025 A1* | 5/2018 | Kampouris | G06Q 10/1091 |
| 2018/0211198 A1 | 7/2018 | Makhoul | |
| 2018/0225650 A1* | 8/2018 | Vossoughi | G08G 1/148 |
| 2018/0253751 A1* | 9/2018 | Kim | G06Q 20/16 |
| 2018/0330451 A1* | 11/2018 | Volberg | G06Q 40/125 |
| 2018/0330814 A1* | 11/2018 | Auer | G16H 40/20 |
| 2019/0095882 A1* | 3/2019 | Parker | H04L 67/32 |

OTHER PUBLICATIONS

Written Opinion dated Sep. 21, 2020 issued in International Application No. PCT/US2020/035631, filed Jun. 2, 2020.
Levine, B., "Move Over, iBeacons—here come mesh beacons", dated Dec. 6, 2014, https://venturebeat.com/2014/12/06/move-over-ibeacons-here-come-mesh-beacons/ retrived on May 29, 2019, 8 pages.
Raghunandan et al., G.H. "Independent Robust Mesh for Mobile Adhoc", 2017 4th International Conference on Electronics and Communication Systems (ICECS), Feb. 24, 2017, pp. 125-128.

* cited by examiner

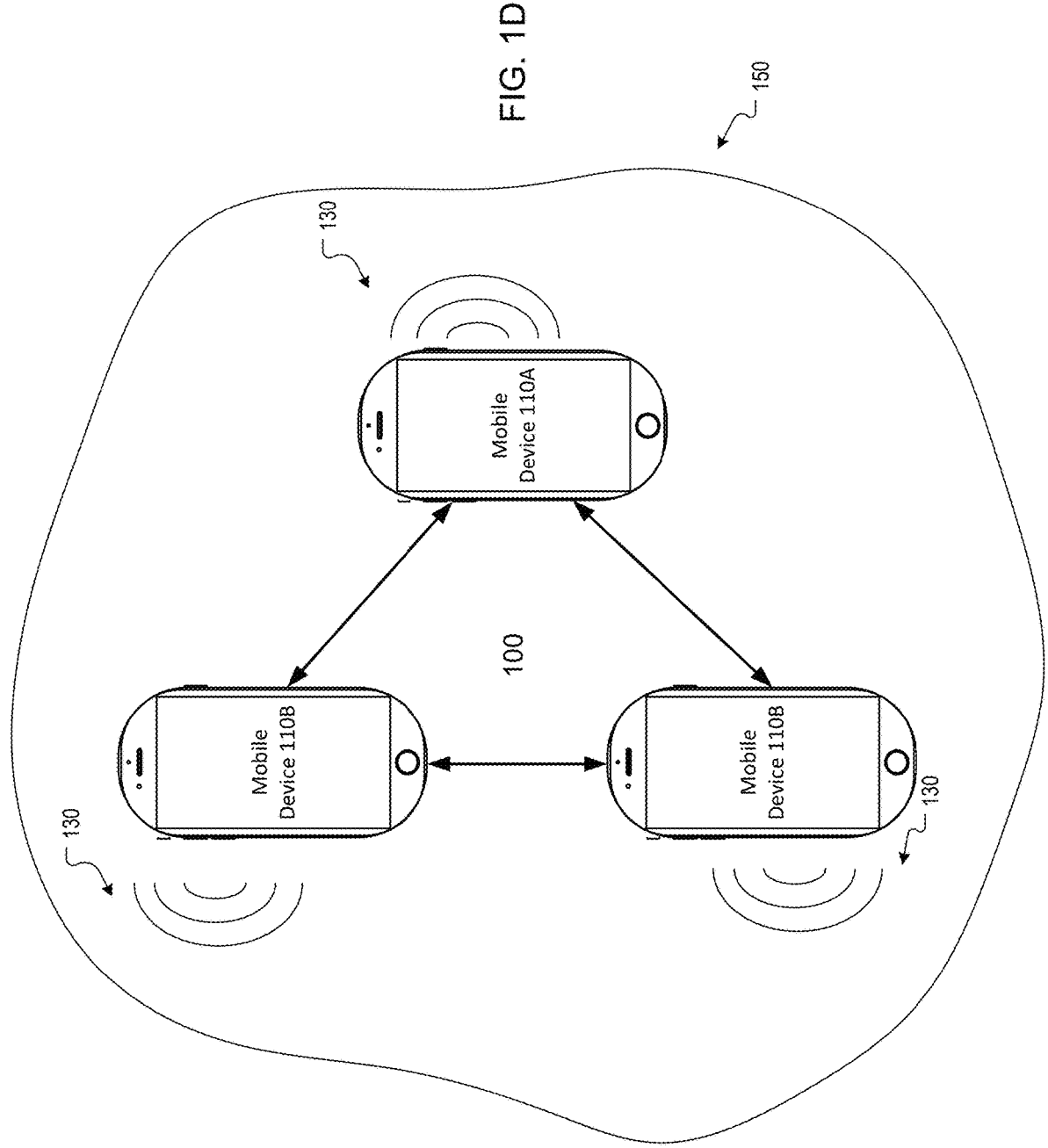

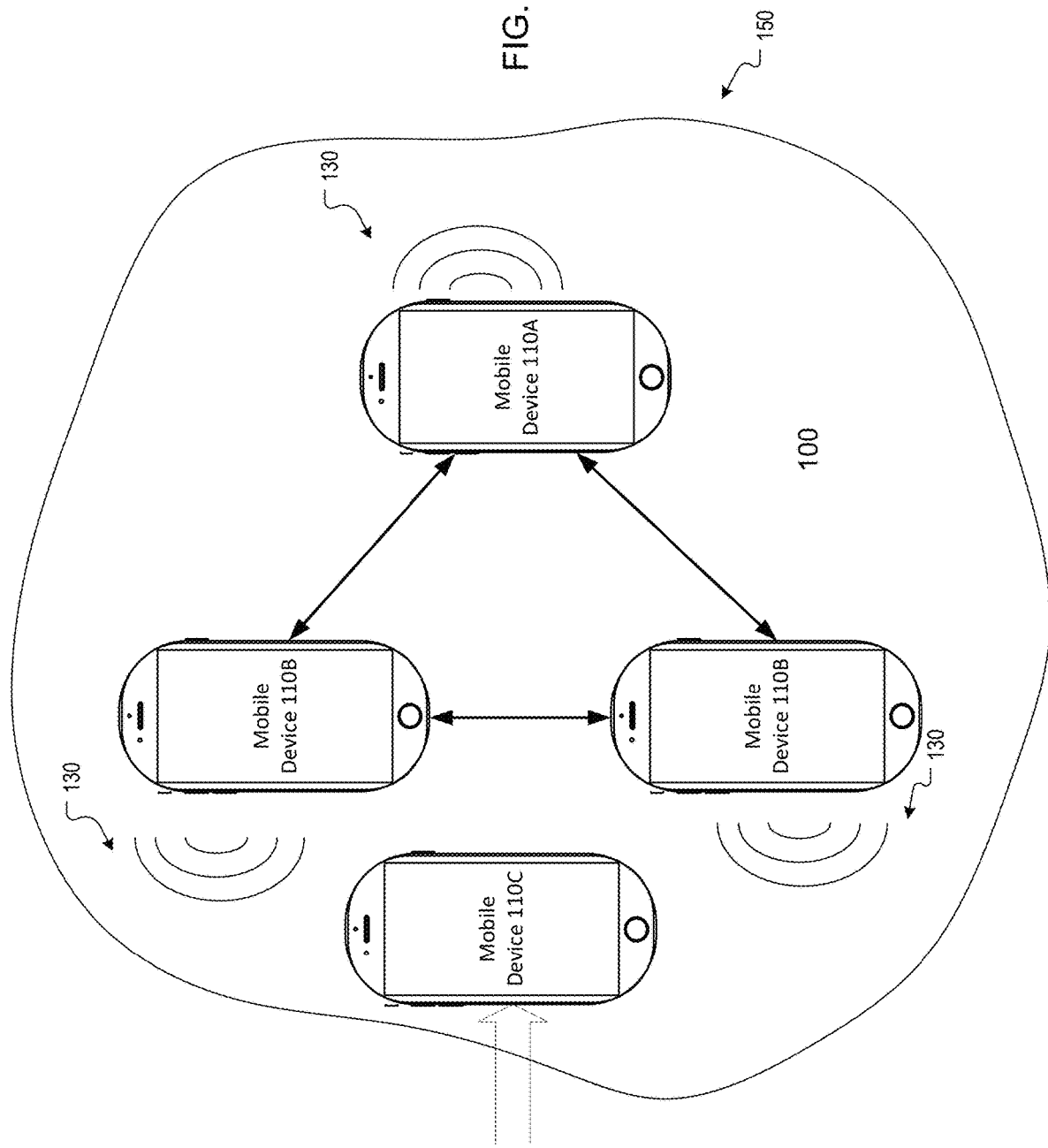

MULTI-USER TIME TRACKING MESH NETWORK

BRIEF DESCRIPTION OF THE FIGURES

FIGS. 1A-1G show a plurality of mobile devices forming a mesh network according to an embodiment of the present disclosure.

DETAILED DESCRIPTION OF SEVERAL EMBODIMENTS

Figure 1A:
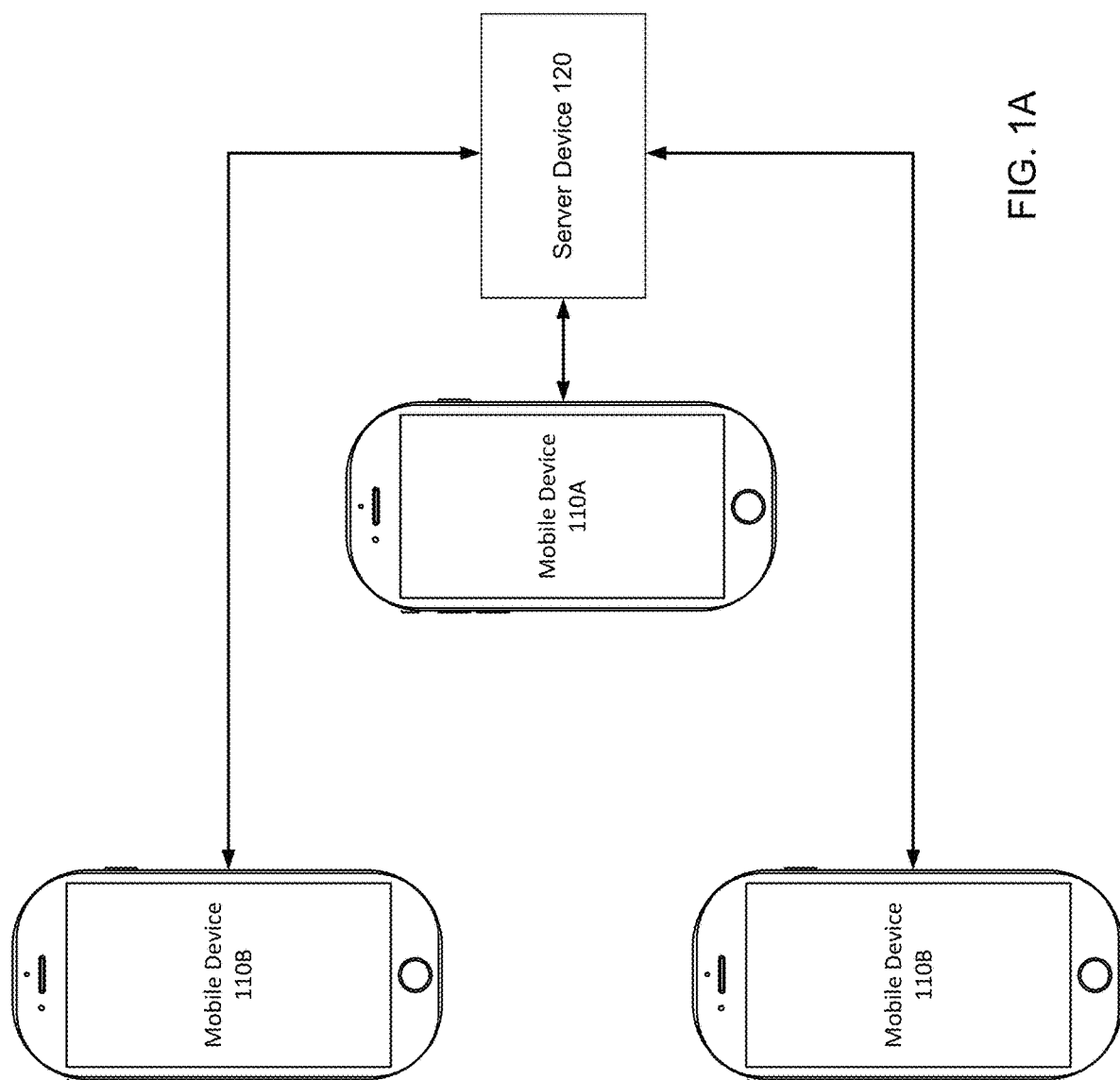

Embodiments described herein may allow mobile computing devices to form and/or utilize mesh networks to perform time capture. For example, teams of workers at a shared job site may work on various tasks and may need to track time accordingly to bill and account for efforts to their employer. Workers may install one or more applications ("apps") on their personal mobile computing devices or may be given mobile computing devices by the employer. The mobile computing devices may use the same or different operating systems and/or equipment (e.g., some or all devices may be Android™ devices, some or all devices may be iOS™ devices, etc.). One or more workers may be designated crew and/or team leaders who may be accountable for time tracking accuracy for the employer. Once a leader has clocked in on their app and is tracking time, the leader's device may begin a low power Bluetooth™ or other broadcast for other workers' mobile computing devices to detect. Workers may arrive to the work site at different times. When another worker arrives at the same job site, the app on the worker's mobile computing device may identify and recognize the crew leader and handshake and authenticate with that crew leader's device in order to share data, such as data indicating when the worker arrived or left so that the worker may be clocked in or out, respectively. This same process may be repeated and scaled to as many workers as are needed without constraint on maximum crew size. Once a handshake has occurred between two devices, each device may leverage known data transportation mechanisms to communicate between each other via notification services and/or other channels.

Embodiments described herein may create ad hoc mesh networks of mobile devices, for example mobile devices of workers assigned to a same task and/or job site. Mesh networks may facilitate communication between the mobile devices to establish an area for the job site and facilitate worker check in and/or check out at the job site, for example. Each mobile device may include an app into which users may log in, and which may include instructions for performing tasks to establish and use the mesh network. A crew leader's mobile device may establish the job site, and may broadcast data that may enable other mobile devices to communicate with the crew leader's mobile device and thereby form the mesh network. As mobile devices enter the mesh network, logged in users who are affiliated with the crew leader may be checked into the job site. The crew leader's mobile device may serve as a point of check in and/or check out for all crew members in some embodiments, which may allow the crew leader to confirm check ins and check outs before they are submitted to a server and/or may reduce traffic to and/or from the server (e.g., compared with each device checking in and/or out with the server directly). As mobile devices leave the mesh network, the users may be checked out of the job site. Boundaries of the mesh network may change as mobile devices join and move around the job site. New mobile devices may check in with the mesh network generally, rather than being required to communicate directly with the crew leader's mobile device, for example.

FIGS. 1A-1G show a plurality of mobile devices 110 forming a mesh network 100 according to an embodiment of the present disclosure. Three mobile devices 110 are shown in FIGS. 1A-1D, and a fourth mobile device 110 is included in FIGS. 1E-1G, but any number of mobile devices 110 may be present. Each mobile device 110 may be, for example, a smartphone, smart watch, tablet, or other computing device that may be carried and/or transported by a user. Different mobile devices 110 may or may not have the same hardware and/or software configurations, although each mobile device 110 may have at least an app for mesh networking and/or check in/check out installed in memory thereon and executable by at least one processor of the mobile device 110. Each mobile device 110 may be configured to communicate by one or more wireless protocols. Example embodiments described herein use a Bluetooth™ low energy (BTLE) wireless protocol for mobile device 110 communication, although other wireless communication protocols and/or methods may be used interchangeably assuming they provide similar functionality to that disclosed herein. In some embodiments, wireless communication functionality such as BTLE may be a built-in function of the operating system and/or default software of mobile device 110. For example, BTLE communication may be an included feature in the Android™ and iOS™ operating systems.

As shown in FIG. 1A, each mobile device 110 may be configured to communicate with at least one server device 120. In some embodiments, each mobile device 110 may communicate with server device 120 by the same communication method as mobile devices 110 use to communicate with one another (e.g., BTLE), but in other embodiments, each mobile device 110 may communicate with server device 120 using other networks and/or communications protocols. For example, each mobile device 110 may communicate with server device 120 using the Internet or another local or wide area network by a wireless connection such as WiFi. Accordingly, server device 120 may or may not be a member of the mesh network formed by mobile devices 110 as described below. For example, when mobile devices 110 communicate with server device 120 through the Internet or another local or wide area network, they may use a different communications protocol and/or different transceivers from those used to communicate with one another, and server device 120 is outside the mesh network. As described in detail below, mobile devices 110 may communicate with server device 120 to allow users to log into apps on mobile devices 110, check in at a job site, check out of a job site, and/or to accomplish other tasks.

Figure 1B:
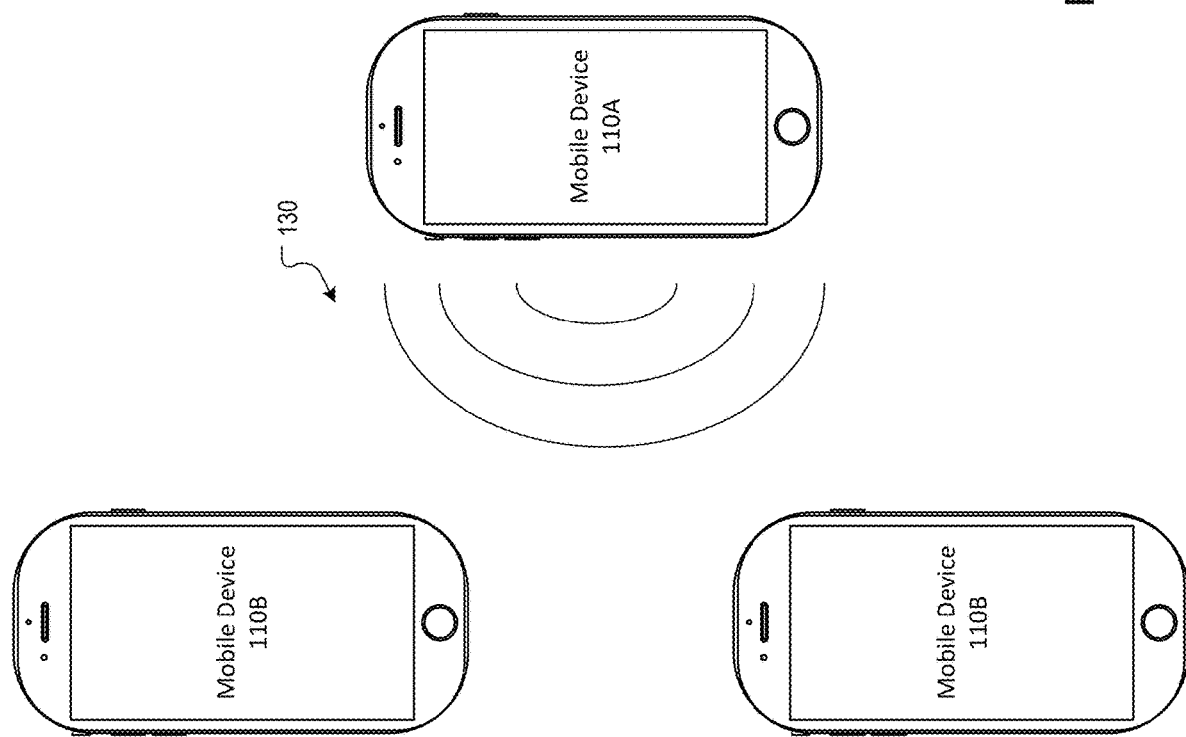
Figure 1C:
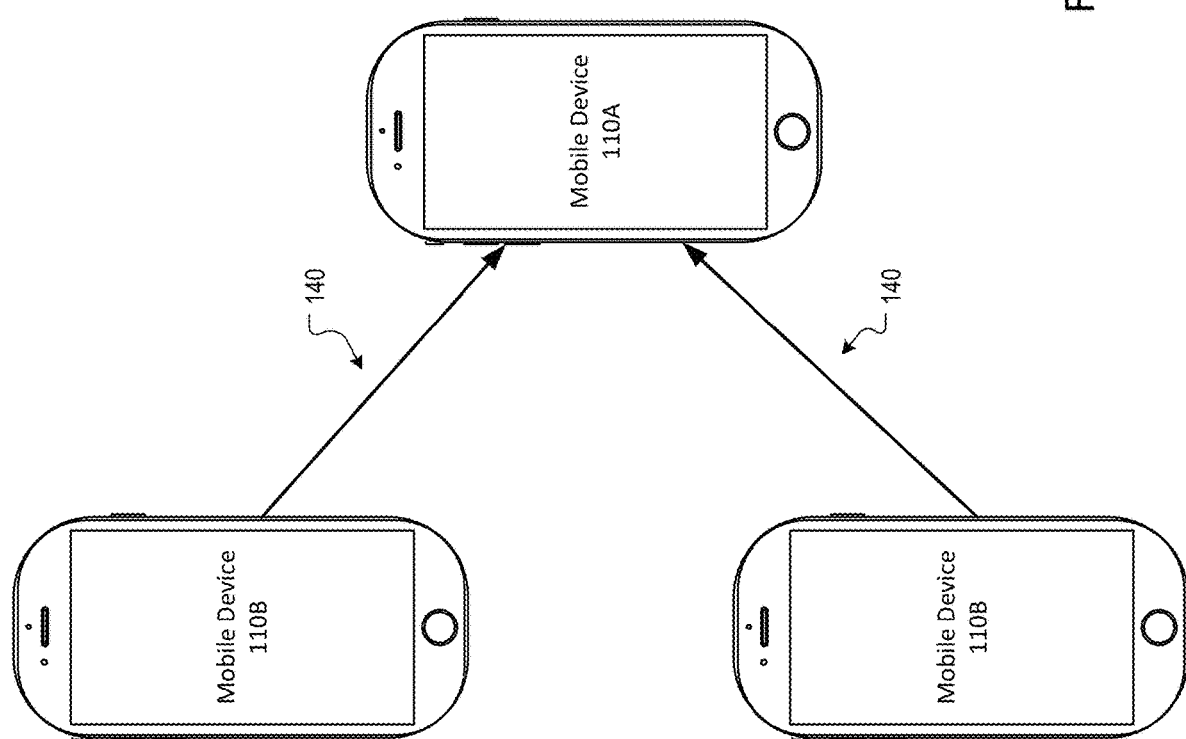

At least one mobile device 110 may be a crew leader mobile device 110A. As shown in FIG. 1B, crew leader mobile device 110A may initiate formation of the mesh network by broadcasting a beacon 130 which may be received by one or more crew member mobile devices 110B. Methods by which crew leader mobile device 110A may generate and transmit beacon 130 are described in detail below with respect to FIGS. 2 and 3, for example. As shown in FIG. 1C, crew member mobile devices 110B that detect beacon 130 may respond by broadcasting reply beacons 140. Methods by which crew member mobile devices 110B may generate and transmit reply beacons 140 are described in detail below with respect to FIGS. 2 and 4, for example.

Figure 1F:
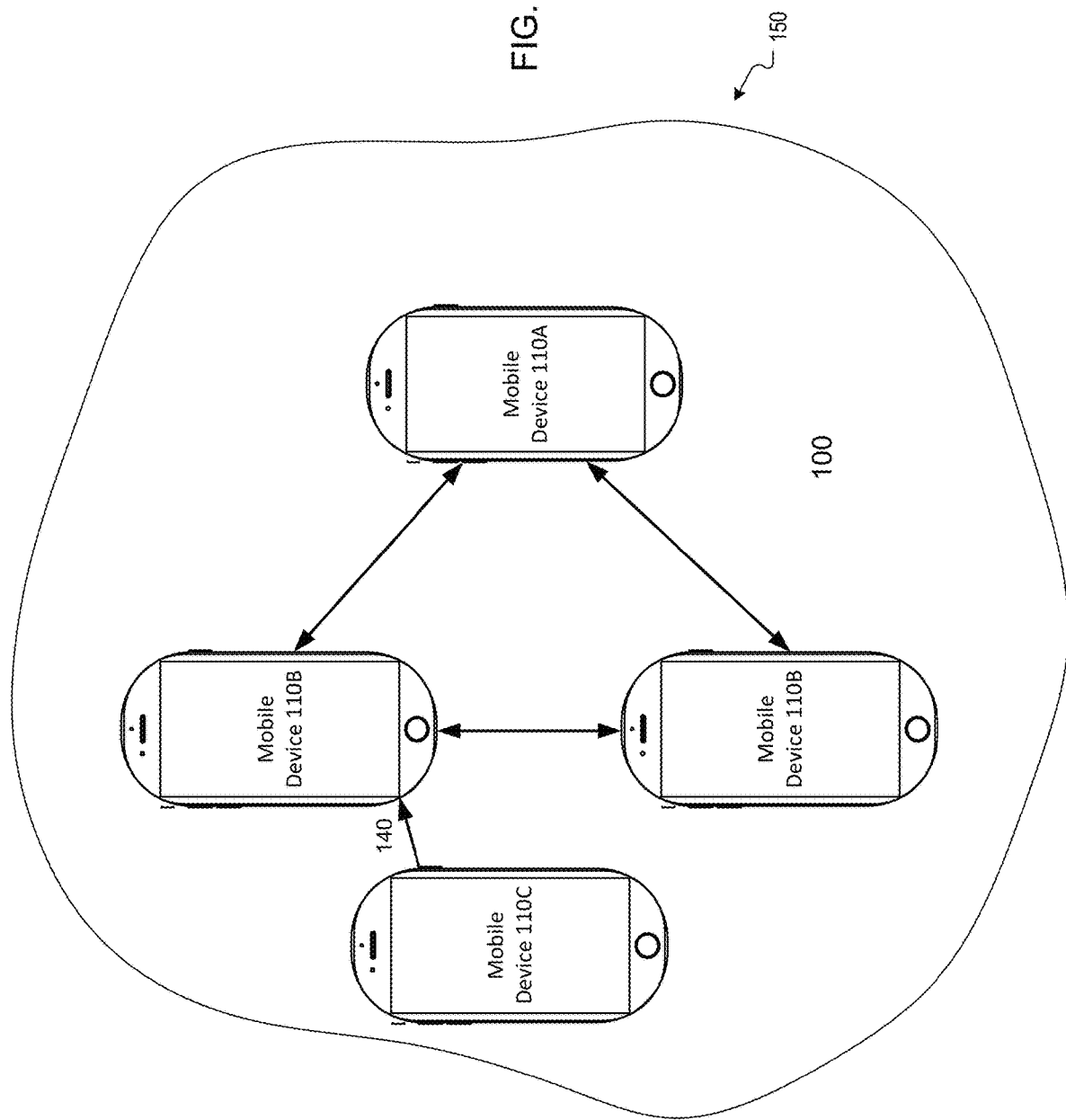
Figure 1G:
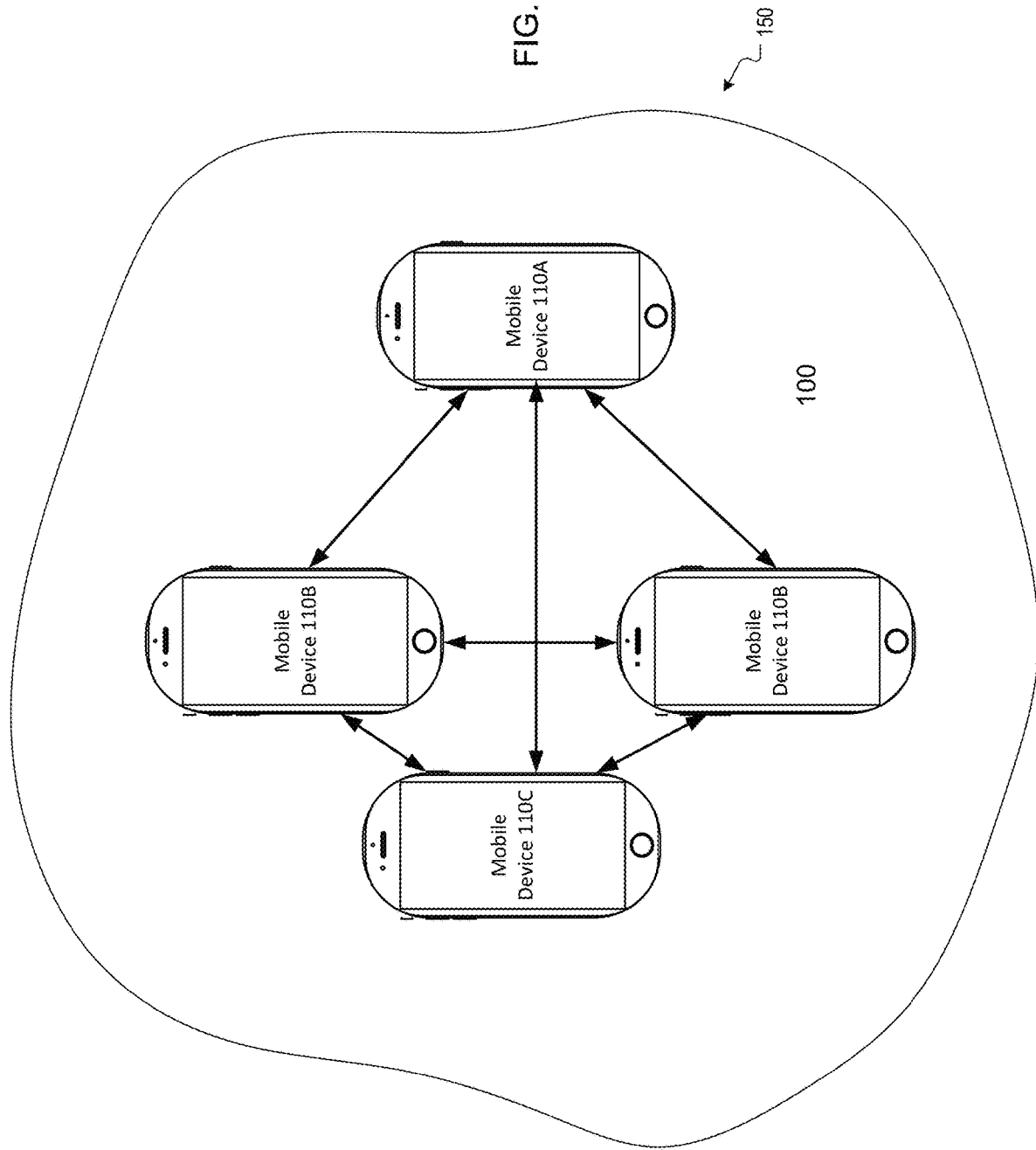

By the exchange of respective beacons and/or additional communications, mobile devices 110 may form mesh network 100, as shown in FIG. 1D and as described in detail below with respect to FIGS. 2-6. In some embodiments, any and/or all mobile devices 110 that are members of mesh network 100 may transmit beacons 130 while in mesh network 100. An approximate boundary 150 of mesh network 100 may be defined as the area in which at least one beacon 130 is detectable. Accordingly, mesh network 100 may grow geographically as additional mobile devices 110 join, and its boundary 150 may fluctuate as mobile devices 110 move around the environment. For example, FIG. 1E shows a new crew member mobile device 110C crossing boundary 150 and detecting at least one beacon 130. As shown in FIG. 1F, new crew member mobile device 110C may transmit a reply beacon 140 and, as shown in FIG. 1G, join mesh network 100. Mobile devices 110 may use mesh network 100 for job site check in and/or check out as described below, and may leave mesh network 100 in response to user command and/or by going out of range (e.g., crossing boundary 150), as described below with respect to FIG. 7.

Figure 2:
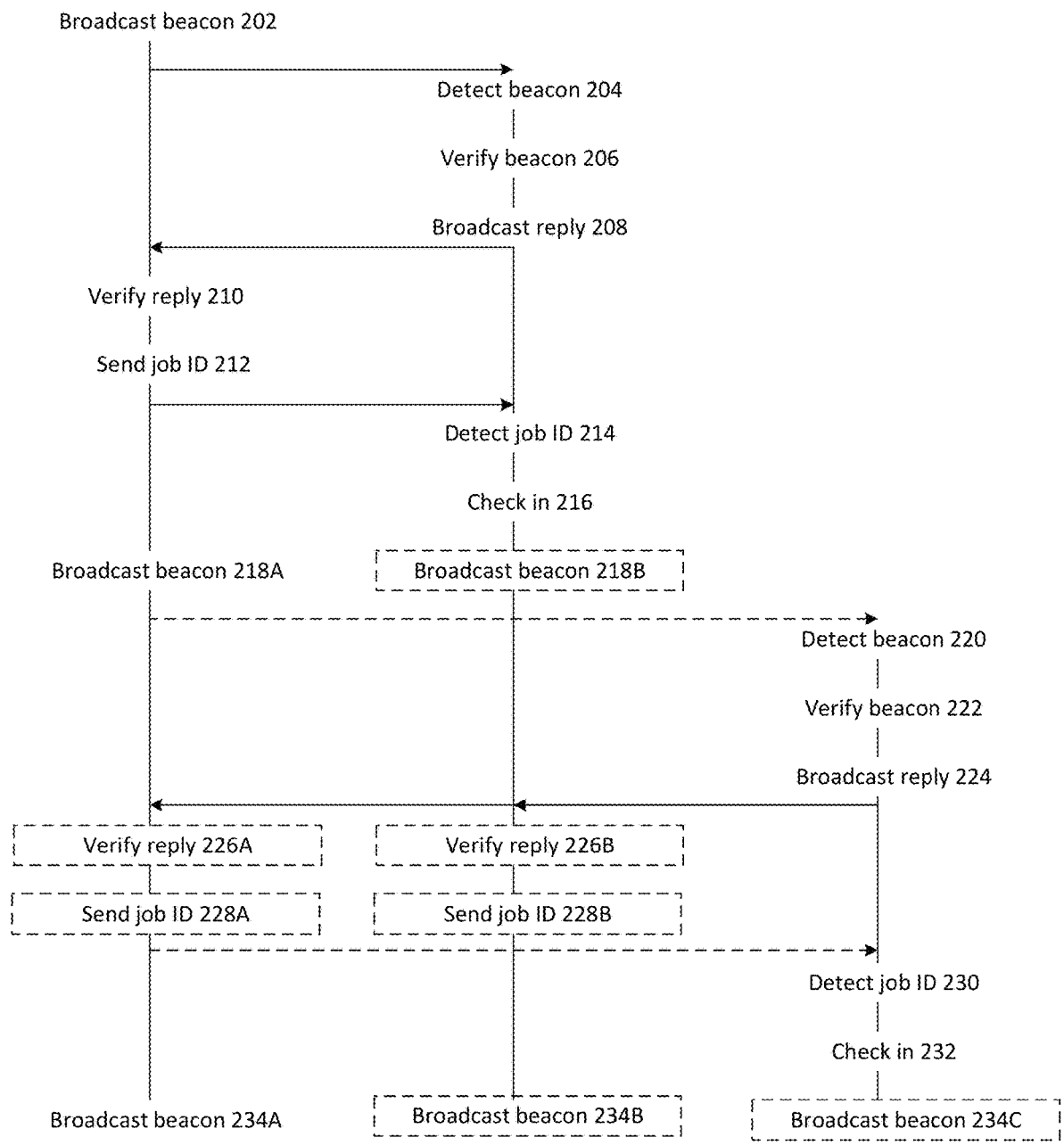
FIG. 2 shows a process by which a mesh network is established and workers are checked into a job according to an embodiment of the present disclosure.

FIG. 2 shows a process 200 by which a mesh network is established and workers are checked into a job according to an embodiment of the present disclosure. A plurality of mobile devices 110 may perform process 200 to establish and use mesh network 100. For example, stages of mesh network 100 formation and operation depicted in FIGS. 1A-1G may correspond to portions of process 200, as described below. By performing process 200, mobile devices 110 may operate a mesh network 100 that allows job sites to be defined and allows crew members to check into and/or out of the job sites, for example. As indicated below, some portions of process 200 are described in greater detail with respect to FIGS. 3-6.

At 202, crew leader mobile device 110A may initiate formation of the mesh network by broadcasting a beacon 130 (e.g., as shown in FIG. 1B). For example, crew leader mobile device 110A may broadcast beacon 130 using BTLE beacon functionality that may be built into mobile device 110A (e.g., as a function of the Android™ or iOS™ operating system and built in Bluetooth™ hardware). Beacon 130 may include a crew ID, which may indicate to other mobile devices 110 the identity of the crew led by the crew leader. The crew may include one or more members (e.g., workers) in addition to the crew leader who may check in and/or check out with the crew leader and may work with and/or for the crew leader on the job site. Each crew may have its own crew ID. A detailed example of a crew leader clock in and beacon generation process 300 comprising 202 is described below with respect to FIG. 3.

At 204, a crew member mobile device 110B may detect beacon 130. In some cases, multiple crew member mobile devices 110B may detect beacon 130, but FIG. 2 is described in the context of a single crew member mobile device 110B for ease of illustration, and any crew member mobile device 110B detecting beacon 130 may function similarly. For example, crew member mobile device 110B may detect beacon 130 using BTLE beacon functionality that may be built into mobile device 110B (e.g., as a function of the Android™ or iOS™ operating system and built in Bluetooth™ hardware). Crew member mobile device 110B may detect beacon 130 when in range of crew leader mobile device 110A (e.g., when within boundary 150). When crew member mobile device 110B has Bluetooth™ services active, crew member mobile device 110B may scan or listen for BTLE beacons and may thereby detect beacon 130.

At 206, crew member mobile device 110B may verify beacon 130 detected at 204. For example, crew member mobile device 110B may extract the crew ID from beacon 130. Crew member mobile device 110B may compare the extracted crew ID with a crew ID assigned to a user of crew member mobile device 110B. If the respective crew IDs match, crew member mobile device 110B may verify beacon 130 as being sent by a crew member with whom the user of crew member mobile device 110B is able to check in.

At 208, crew member mobile device 110B may broadcast reply beacon 140 (e.g., as shown in FIG. 1C). For example, crew member mobile device 110B may broadcast reply beacon 140 using BTLE beacon functionality that may be built into mobile device 110B (e.g., as a function of the Android™ or iOS™ operating system and built in Bluetooth™ hardware). Reply beacon 140 may include a user ID, which may indicate to other mobile devices 110 the identity of the user logged into an account on crew member mobile device 110B. Each individual user may have a unique user ID, and these users (and/or their user IDs) may be associated with (e.g., members of) one or more crews identified by respective crew IDs as described above. A detailed example of a crew member reply beacon generation process 400 comprising 204-208 is described below with respect to FIG. 4.

At 210, crew leader mobile device 110A may receive and verify reply beacon 140. For example, as with mobile device 110B, mobile device 110A may be configured to detect reply beacon 140 using built-in BTLE functionality. Crew leader mobile device 110A may extract the user ID from reply beacon 140. Crew leader mobile device 110A may look up the extracted user ID in a table, list, or other set of user IDs assigned to the crew ID. If the user ID is found, crew leader mobile device 110A may verify reply beacon 140 as being sent by a crew member who can check in with the crew leader for a job associated with the crew ID.

At 212, crew leader mobile device 110A may generate a job beacon including a job ID indicating the job associated with the crew ID. For example, crew leader mobile device 110A may broadcast beacon 130 using BTLE beacon functionality that may be built into mobile device 110A (e.g., as a function of the Android™ or iOS™ operating system and built in Bluetooth™ hardware). A detailed example of a job beacon generation process 500 comprising 210-212 is described below with respect to FIG. 5.

At 214, crew member mobile device 110B may detect the job beacon and extract the job ID. At 216, crew member mobile device 110B may check into the job identified by the job ID. For example, crew member mobile device 110B may communicate with server device 120 to perform the check in. A detailed example of a check in process 600 comprising 214-216 is described below with respect to FIG. 6.

At 218, after facilitating check in by crew member mobile device 110B through transmission of the job ID, crew leader mobile device 110A may resume broadcasting (218A) beacon 130. Crew member mobile device 110B, being checked into the job, may now be a member of mesh network 100 (e.g., as shown in FIG. 1D). In some embodiments, members of mesh network 100 in addition to crew leader mobile device 110A may also broadcast beacon 130. In this case, crew member mobile device 110B may broadcast (218B) beacon 130.

In some cases, additional crew member mobile devices 110C may enter the boundary 150 of mesh network 100 (e.g., as shown in FIG. 1E). At 220, new crew member mobile device 110C may detect beacon 130. Like other mobile devices 110, crew member mobile device 110C may detect beacon 130 using BTLE beacon functionality that may be built into mobile device 110C (e.g., as a function of the Android™ or iOS™ operating system and built in Bluetooth™ hardware), for example.

At 222, new crew member mobile device 110C may verify beacon 130 detected at 220. For example, new crew member mobile device 110C may extract the crew ID from beacon 130. New crew member mobile device 110C may compare the extracted crew ID with a crew ID assigned to a user of new crew member mobile device 110C. If the respective crew IDs match, new crew member mobile device 110C may verify beacon 130 as being sent by a crew member with whom the user of new crew member mobile device 110C is able to check in (e.g., by a mobile device 110 that is part of mesh network 100).

At 224, new crew member mobile device 110C may broadcast reply beacon 140 (e.g., as shown in FIG. 1F). For example, new crew member mobile device 110C may broadcast reply beacon 140 using BTLE beacon functionality that may be built into mobile device 110C (e.g., as a function of the Android™ or iOS™ operating system and built in Bluetooth™ hardware). Reply beacon 140 may include a user ID, which may indicate to other mobile devices 110 the identity of the user logged into an account on new crew member mobile device 110C.

At 226, at least one mobile device 110 in mesh network 100 may receive and verify reply beacon 140. In some embodiments, only crew leader mobile device 110A may be able to verify reply beacon 140. Accordingly, other mobile devices 110 of mesh network 100 (e.g., crew member mobile devices 110B) may rebroadcast reply beacon 140 in an attempt to ensure it is received by crew leader mobile device 110A, which may then verify reply beacon 140 (e.g., 226A). In other embodiments, any mobile device 110 of mesh network 100 may be able to verify reply beacon 140 (e.g., 226B). In either case, the mobile device 110 that is verifying reply beacon 140 may detect reply beacon 140 using built-in BTLE functionality, extract the user ID from reply beacon 140, and look up the extracted user ID in a table, list, or other set of user IDs assigned to the crew ID. If the user ID is found, the mobile device 110 that is verifying reply beacon 140 may verify reply beacon 140 as being sent by a crew member who can check in with the crew leader for a job associated with the crew ID.

At 228, the mobile device 110 that is verifying reply beacon 140 may generate a job beacon including a job ID indicating the job associated with the crew ID. For example, the mobile device 110 that is verifying reply beacon 140 may broadcast beacon 130 (e.g., 228A or 228B) using BTLE beacon functionality that may be built into mobile device 110 (e.g., as a function of the Android™ or iOS™ operating system and built in Bluetooth™ hardware).

At 230, new crew member mobile device 110C may detect the job beacon and extract the job ID. At 232, new crew member mobile device 110C may check into the job identified by the job ID. For example, new crew member mobile device 110C may communicate with server device 120 to perform the check in.

At 234, after facilitating check in by new crew member mobile device 110C through transmission of the job ID, crew leader mobile device 110A may resume broadcasting (234A) beacon 130. At this point, new crew member mobile device 110C may be a member of mesh network 100 (e.g., as shown in FIG. 1G). In some embodiments, members of mesh network 100 in addition to crew leader mobile device 110A may also broadcast beacon 130. In this case, crew member mobile device 110B may broadcast (234B) beacon 130 and/or new crew member mobile device 110C may broadcast (234C) beacon 130.

Activity at 220-234 illustrates how mesh network 100 may grow as additional mobile devices 110 are added. In some embodiments, any number of mobile devices 110 may be added to mesh network 100. FIG. 2 shows two iterations of adding mobile devices 110 for ease of illustration, but processing at 202-218 and/or 220-234 may be repeated as new mobile devices 110 enter the boundary 150 in some embodiments.

Figure 3:
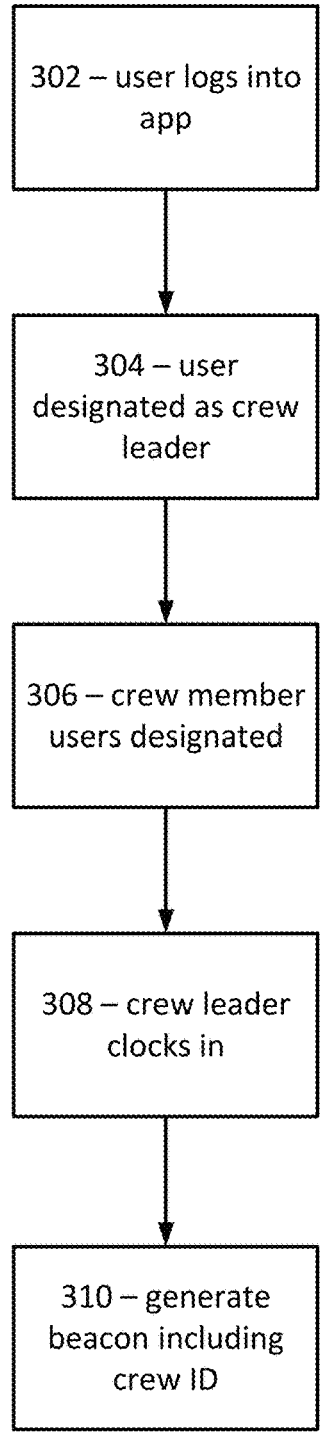
FIG. 3 shows a crew leader clock in and beacon generation process according to an embodiment of the present disclosure.

FIG. 3 shows a crew leader clock in and beacon generation process 300 according to an embodiment of the present disclosure. For example, crew leader mobile device 110A may perform process 300 and thereby initiate formation of mesh network 100. In some embodiments, crew leader mobile device 110A may perform process 300 in the context of process 200 (e.g., see processing at 202 described above).

At 302, crew leader mobile device 110A may log a user into an app for mesh networking and/or check in/check out installed in memory thereon. For example, a crew leader user may enter one or more login credentials for a particular user ID (e.g., the crew leader's user ID) through a user interface (UI) presented by mobile device 110A. Mobile device 110A may communicate with server device 120 to verify the credentials and log the user into the account. Any user login and/or verification techniques may be used by mobile device 110A and server device 120 to perform the login. Once the user is logged in, mobile device 110A may provide a UI allowing the user to access app functionality.

At 304, crew leader mobile device 110A and/or server device 120 may designate the user as a crew leader. For example, the UI may provide the user with an option to log in as a crew leader. In another example, server device 120 may maintain data identifying users who are crew leaders and, when verifying credentials received at 302, may send an indication to mobile device 110A that the user is a crew leader and may have access to crew leader functionality within the app.

At 306, crew member users may be designated. For example, the app UI may provide the crew leader user with the ability to enter and/or select crew members to be affiliated with a crew ID for a crew led by the crew leader user. Each crew member may have a user ID. The crew leader may designate user IDs of individuals who work under the crew leader at a job site. Mobile device 110A may store these designations locally and/or may send the designations to server device 120, where they may be stored. In some cases, crew members may have been previously designated, and mobile device 110A may retrieve these designations from memory and/or may receive the designations from server device 120.

At 308, crew leader mobile device 110A may clock the crew leader user in to a job. For example, the app UI may provide the user with an option to clock in and/or may automatically clock the user in (e.g., in response to crew leader mobile device 110A detecting that it is at a job location by global positioning service (GPS) or other location finding hardware and/or software of crew leader mobile device 110A). In some embodiments, a location service that may perform device location determination may be an included feature in the Android™ and iOS® operating systems and/or may be otherwise available from mobile device 110 hardware and/or software. To effect the clock in, crew leader mobile device 110A may send a message to server device 120 indicating the user ID of the crew leader, a time at which the crew leader clocked in, a job to which the crew leader clocked in, and/or other information. In response to receiving the message, server device 120 may log the clock in, allowing the crew leader's time at work to be recorded starting at the clock in time indicated in the message, for example. Server device 120 may send a reply message to crew leader mobile device 110A indicating that the crew leader is clocked in.

At 310, in response to the message from server device 120 and/or in response to the selection through the UI and/or automatic decision to clock in from 308, crew leader mobile device 110A may generate beacon 130 and periodically and/or repeatedly broadcast beacon 130. For example, as described above, crew leader mobile device 110A may include hardware and/or software that is configured to generate and broadcast BTLE or other beacons. The beacons may have a standard format (e.g., BTLE beacons may be a series of bits that are arranged in a largely predetermined format). Within the format, there may be a portion of the beacons that is reserved for a data payload. To generate beacon 130, crew leader mobile device 110A may add data to this payload. The payload data may include, for example, the crew ID from 306. Crew leader mobile device 110A may repeatedly broadcast beacon 130, for example at regular intervals. Other mobile devices 110 that detect beacon 130 may be able to identify the crew ID within beacon 130.

Figure 4:
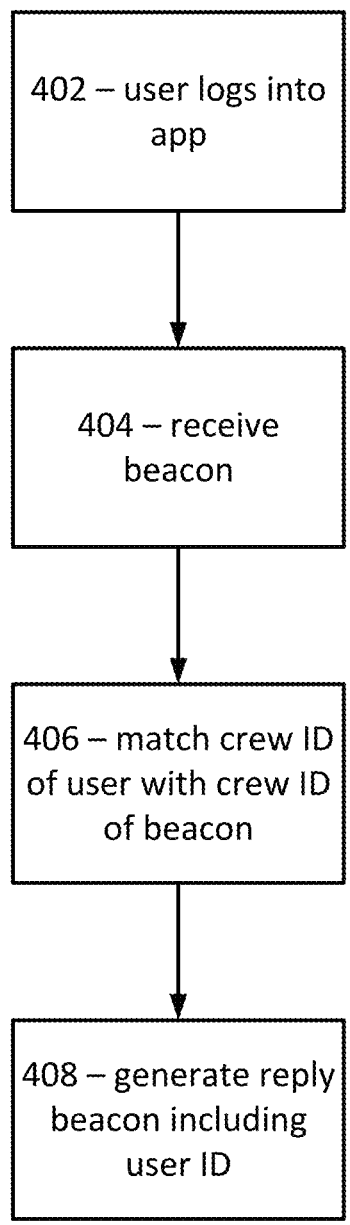
FIG. 4 shows a crew member reply beacon generation process according to an embodiment of the present disclosure.

FIG. 4 shows a crew member reply beacon generation process 400 according to an embodiment of the present disclosure. For example, crew member mobile device 110B may perform process 400 and thereby continue formation of mesh network 100. In some embodiments, crew member mobile device 110B may perform process 400 in the context of process 200 (e.g., see processing at 204-208 described above).

At 402, crew member mobile device 110B may log a user into an app for mesh networking and/or check in/check out installed in memory thereon. For example, a crew member user may enter one or more login credentials for a particular user ID (e.g., the crew member's user ID) through a UI presented by mobile device 110B. Mobile device 110B may communicate with server device 120 to verify the credentials and log the user into the account. Any user login and/or verification techniques may be used by mobile device 110B and server device 120 to perform the login. Once the user is logged in, mobile device 110B may provide a UI allowing the user to access app functionality.

At 404, crew member mobile device 110B may receive beacon 130. For example, beacon 130 may be generated and broadcast according to process 300 described above. When crew member mobile device 110B is in range of a mobile device 110 broadcasting beacon 130 (e.g., within range of crew leader mobile device 110A), crew member mobile device 110B may detect beacon 130 using onboard BTLE software and/or hardware, for example.

In some embodiments, crew member mobile device 110B may receive beacon 130 from a broadcast by a mobile device 110 that is different from the crew leader mobile device 110A that initially generated beacon 130 according to process 300. For example, mobile devices 110 that are members of mesh network 100 (e.g., through prior joining of mesh network initiated by crew leader mobile device 110A) may be configured to retransmit beacons 130 that they detect. In these embodiments, any mobile device 110 of mesh network 100 that is not a crew leader mobile device 110A may respond to receiving beacon 130 by retransmitting beacon 130. Accordingly, beacon 130 may be detectable throughout mesh network 100, allowing crew member mobile device 110B to detect beacon 130 even when out of direct range of the crew leader mobile device 110A that initially generated beacon 130, effectively expanding the geographic footprint of mesh network 100 to encompass the BTLE broadcast and/or detection range of all mobile device 110 members.

At 406, crew member mobile device 110B may extract the crew ID from the payload of beacon 130. Crew member mobile device 110B may compare the crew ID with a crew ID associated with the user. For example, due to the logging in at 402, a user account may be active on crew member mobile device 110B. The user account may have a user ID associated therewith. As described above, a crew leader may have designated user IDs of individuals who work under the crew leader at a job site and are therefore affiliated with the crew ID from beacon 130. In response to the logging in at 402, server device 120 may send the crew ID of the logged-in user to crew member mobile device 110B and/or crew member mobile device 110B may obtain the crew ID of the logged-in user from local memory. Crew member mobile device 110B may compare the logged-in user's crew ID with the crew ID from beacon 130. If they do not match, crew member mobile device 110B may ignore beacon 130. If they do match, process 400 may proceed.

At 408, crew member mobile device 110B may generate reply beacon 140 and periodically and/or repeatedly broadcast reply beacon 140. For example, as described above, crew member mobile device 110B may include hardware and/or software that is configured to generate and broadcast BTLE or other beacons. The beacons may have a standard format (e.g., BTLE beacons may be a series of bits that are arranged in a largely predetermined format). Within the format, there may be a portion of the beacons that is reserved for a data payload. To generate reply beacon 140, crew member mobile device 110B may add data to this payload. The payload data may include, for example, the crew member's user ID. Crew member mobile device 110B may repeatedly broadcast reply beacon 140, for example at regular intervals. Other mobile devices 110 that detect reply beacon 140 may be able to identify the user ID within reply beacon 140.

Figure 5:
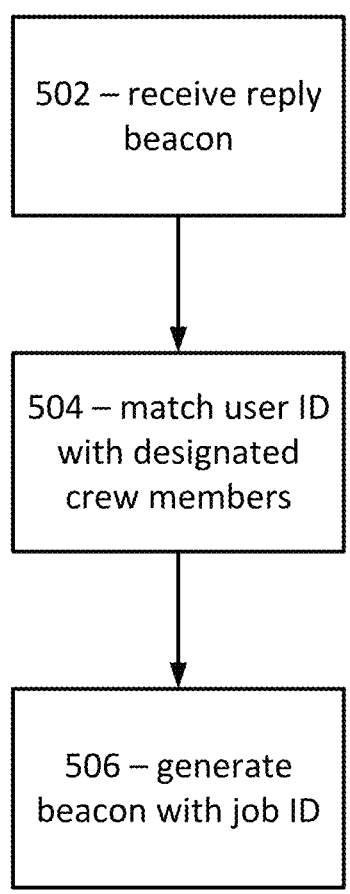
FIG. 5 shows a job beacon generation process according to an embodiment of the present disclosure.

FIG. 5 shows a job beacon generation process 500 according to an embodiment of the present disclosure. For example, crew leader mobile device 110A may perform process 500 and thereby continue formation of mesh network 100. In some embodiments, crew leader mobile device 110A may perform process 500 in the context of process 200 (e.g., see processing at 210-212 described above).

At 502, crew leader mobile device 110A may receive reply beacon 140. For example, reply beacon 140 may be generated and broadcast according to process 400 described above. When crew leader mobile device 110A is in range of a mobile device 110 broadcasting reply beacon 140 (e.g., within range of crew member mobile device 110B), crew leader mobile device 110A may detect reply beacon 140 using onboard BTLE software and/or hardware, for example.

In some embodiments, the crew member mobile device 110B from which crew leader mobile device 110A receives reply beacon 140 may not necessarily be the crew member mobile device 110B that initially generated reply beacon 140 according to process 400. For example, mobile devices 110 that are members of mesh network 100 (e.g., through prior joining of mesh network initiated by crew leader mobile device 110A) may be configured to retransmit reply beacons 140 that they detect. In these embodiments, any mobile device 110 of mesh network 100 that is not a crew leader mobile device 110A may respond to receiving reply beacon 140 by retransmitting reply beacon 140. Accordingly, reply beacon 140 may be detectable throughout mesh network 100, allowing crew leader mobile device 110A to detect reply beacon 140 even when out of direct range of the crew member mobile device 110B that initially generated reply beacon 140, effectively expanding the geographic footprint of mesh network 100 to encompass the BTLE broadcast and/or detection range of all mobile device 110 members.

At 504, crew leader mobile device 110A may extract the user ID from the payload of reply beacon 140. Crew leader mobile device 110A may compare the user ID with the user IDs that have been designated as assigned to the crew ID as described above. If the user ID has not been designated as assigned to the crew ID, crew leader mobile device 110A may ignore reply beacon 140. If the user ID has been designated as assigned to the crew ID, process 500 may proceed.

At 506, crew leader mobile device 110A may generate a beacon including a job ID and periodically and/or repeatedly broadcast the job ID. For example, as described above, crew leader mobile device 110A may add the job ID to a beacon payload and may repeatedly broadcast the beacon including the job ID, for example at regular intervals. Other mobile devices 110 that detect the beacon may be able to identify the job ID within the payload.

Figure 6:
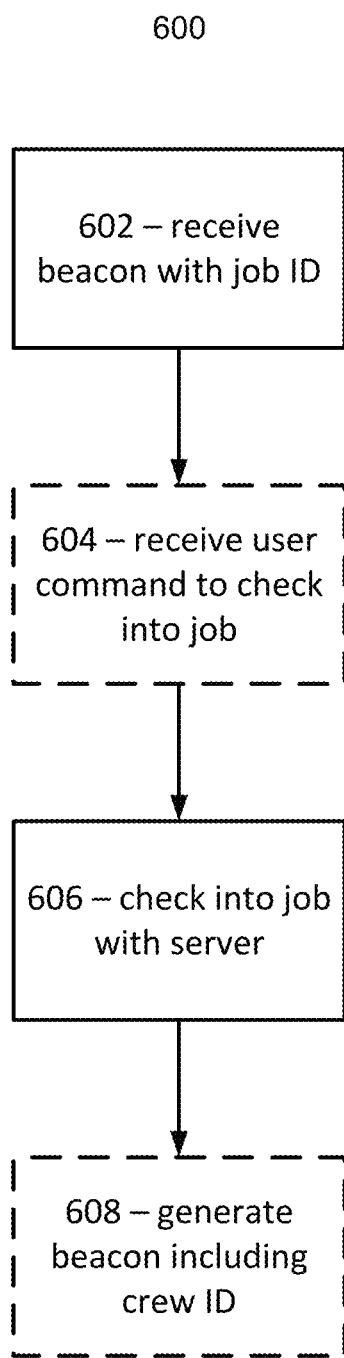
FIG. 6 shows a check in process according to an embodiment of the present disclosure.

FIG. 6 shows a check in process 600 according to an embodiment of the present disclosure. For example, crew member mobile device 110B may perform process 600 and thereby join mesh network 100. In some embodiments, crew member mobile device 110B may perform process 600 in the context of process 200 (e.g., see processing at 214-216 described above).

At 602, crew member mobile device 110B may receive the beacon including the job ID. For example, the beacon including the job ID may be generated and broadcast according to process 500 described above. When crew member mobile device 110B is in range of a mobile device 110 broadcasting the beacon including the job ID (e.g., within range of crew leader mobile device 110A), crew member mobile device 110B may detect the beacon including the job ID using onboard BTLE software and/or hardware, for example.

In some embodiments, crew member mobile device 110B may receive the beacon including the job ID from a broadcast by a mobile device 110 that is different from the crew leader mobile device 110A that initially generated the beacon according to process 500. For example, mobile devices 110 that are members of mesh network 100 (e.g., through prior joining of mesh network initiated by crew leader mobile device 110A) may be configured to retransmit beacons that they detect. In these embodiments, any mobile device 110 of mesh network 100 that is not a crew leader mobile device 110A may respond to receiving the beacon including the job ID by retransmitting the beacon. Accordingly, the beacon may be detectable throughout mesh network 100, allowing crew member mobile device 110B to detect the beacon even when out of direct range of the crew leader mobile device 110A that initially generated the beacon including the job ID, effectively expanding the geographic footprint of mesh network 100 to encompass the BTLE broadcast and/or detection range of all mobile device 110 members. Crew member mobile device 110B may extract the job ID from the beacon payload.

At 604, in response to receiving the job ID, crew member mobile device 110B may provide an option through the UI to allow the user to clock into the job identified by the job ID. For example, the app may push a notification to the crew member mobile device 110B lock screen or main screen, and the user may be able to click the notification and clock in. In another example, the user may be able to go into the app UI and clock in. In some embodiments, crew member mobile device 110B may perform processing to clock the user in automatically upon receiving the job ID, and processing at 604 may be skipped in these embodiments.

At 606, crew member mobile device 110B may clock the user into the job identified by job ID. To effect the clock in, crew member mobile device 110B may send a message to server device 120 indicating the user ID of the user, a time at which the user clocked in, the job ID for the job to which the user clocked in, and/or other information. In response to receiving the message, server device 120 may log the clock in, allowing the user's time at work to be recorded starting at the clock in time indicated in the message, for example. Server device 120 may send a reply message to crew member mobile device 110B indicating that the user is clocked in. Once the user is clocked in, crew member mobile device 110B may be a member of mesh network 100.

At 608, in some embodiments, crew member mobile device 110B may periodically and/or repeatedly broadcast beacon 130. For example, as described above, crew member mobile devices 110B may rebroadcast beacon 130 that originated with crew leader mobile device 110A to extend the geographic footprint of the mesh network. To generate beacon 130, crew member mobile device 110B may add the data from previously received beacon 130 (e.g., as received at 404 of process 400) into its own version of beacon 130. The payload data may include, for example, the crew ID. Crew member mobile device 110B may repeatedly broadcast beacon 130, for example at regular intervals. Other mobile devices 110 that detect beacon 130 may be able to identify the crew ID within beacon 130.

Figure 7:
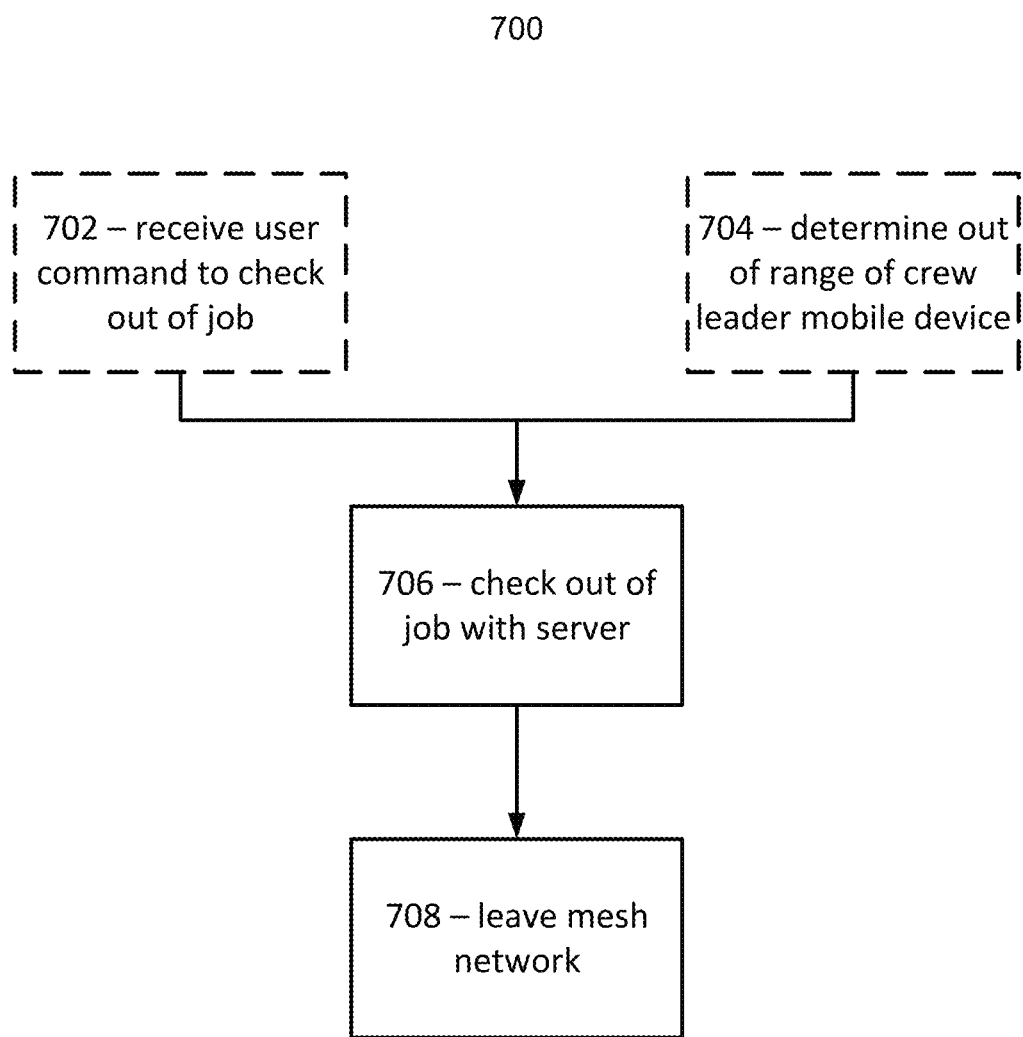
FIG. 7 shows a check out process according to an embodiment of the present disclosure.

FIG. 7 shows a check out process 700 according to an embodiment of the present disclosure. A mobile device 110 (e.g., crew leader mobile device 110A and/or crew member mobile device 110B) within mesh network 100 may perform process 700 to enable a user to clock out of a job to which they have clocked in (e.g., by process 300 or 600). Process 700 may begin at 702 or 704 depending on what triggers the need for the user to clock out.

At 702, mobile device 110 may receive a user command to clock out. For example, the user may enter the command through the UI of the app. At 704, mobile device 110 may determine that it has moved out of range of crew leader mobile device 110A or out of range of mesh network 100 generally. For example, mobile device 110 may stop receiving beacon 130. In some embodiments, after failing to receive beacon 130 for some predetermined interval of time, mobile device 110 may push a notification to mobile device 110 lock screen or main screen, and the user may be able to click the notification and confirm mobile device 110 is out of range and/or the user wishes to clock out.

At 706, mobile device 110 may clock out. To effect the clock out, mobile device 110 may send a message to server device 120 indicating the user ID of the user logged into the app on mobile device 110, a time at which the user clocked out, a job ID of the job from which the user clocked out, and/or other information. In response to receiving the message, server device 120 may log the clock out, stopping recording of the user's time on the job at the clock out time indicated in the message, for example. Server device 120 may send a reply message to mobile device 110 indicating that the user is clocked out.

At 708, if mobile device 110 had not already left mesh network 100 (e.g., by moving out of range as described above), mobile device 100 may leave mesh network 100 upon clock out. For example, as a result of leaving mesh network 100, mobile device 100 may cease any ongoing broadcast of beacon 130 or other beacons described above.

Figure 8:
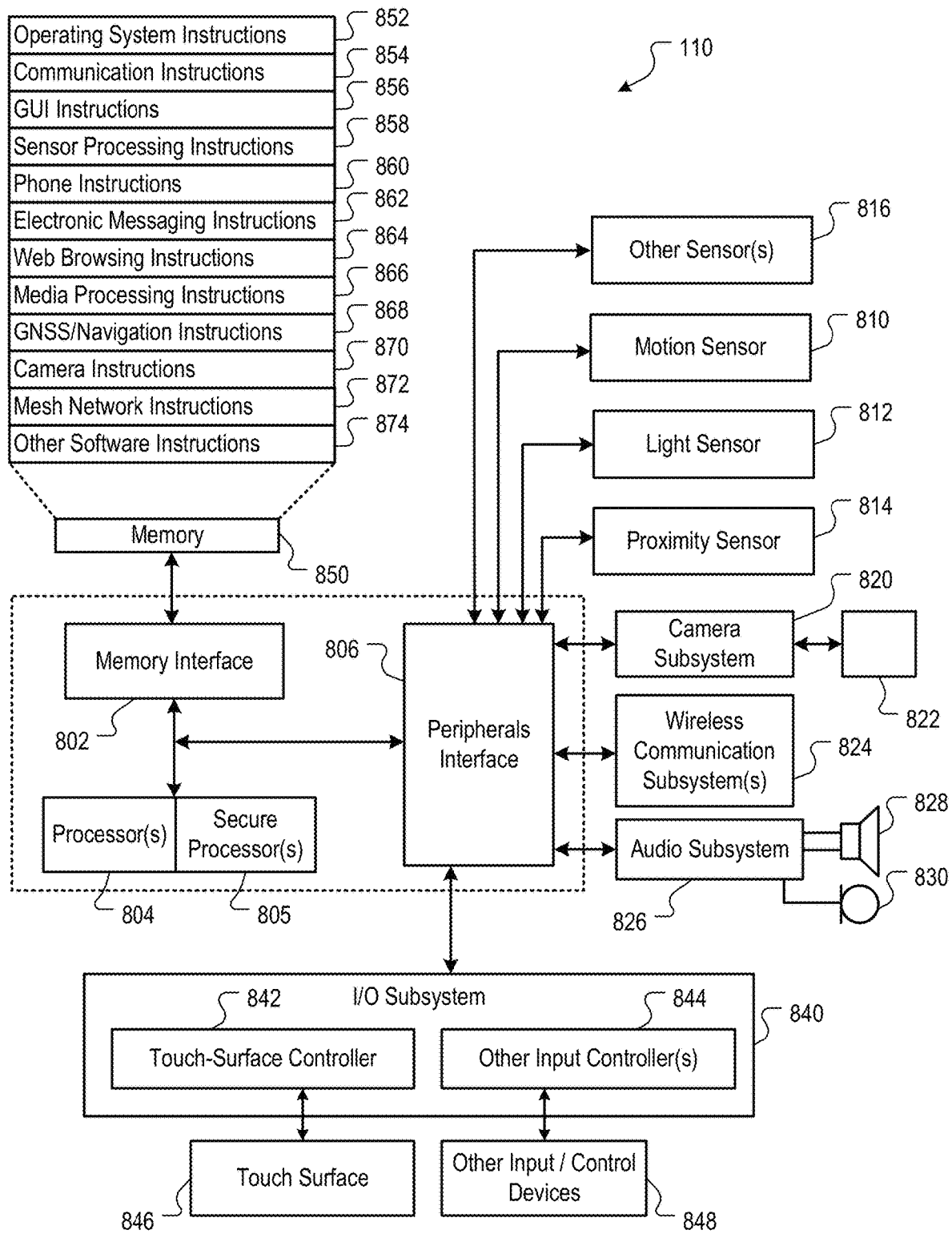
FIG. 8 shows a computing device according to an embodiment of the present disclosure.

FIG. 8 shows a computing device according to an embodiment of the present disclosure, for example a computing device configured to function as mobile device 110 (e.g., crew leader mobile device 110A or other mobile device 110B/110C). Mobile device 110 may include a memory interface 802, one or more data processors, image processors, central processing units 804, and a peripherals interface 806. The memory interface 802, the one or more processors 804, and/or the peripherals interface 806 may be separate components or may be integrated in one or more integrated circuits. The various components in mobile device 110 may be coupled by one or more communication buses or signal lines and/or by one or more network connections.

Sensors, devices, and subsystems may be coupled to the peripherals interface 806 to facilitate multiple functionalities. For example, a motion sensor 810, a light sensor 812, and a proximity sensor 814 may be coupled to the peripherals interface 806 to facilitate orientation, lighting, and proximity functions. Other sensors 816 may also be connected to the peripherals interface 806, such as a global navigation satellite system (GNSS) (e.g., GPS receiver), a temperature sensor, a biometric sensor, magnetometer, or other sensing device, to facilitate related functionalities.

A camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. The camera subsystem 820 and the optical sensor 822 may be used to collect images of a user to be used during authentication of a user, e.g., by performing facial recognition analysis.

Communication functions may be facilitated through one or more wired and/or wireless communication subsystems 824, which can include radio frequency receivers and transmitters and/or optical (e.g., infrared) receivers and transmitters. For example, the Bluetooth (e.g., Bluteooth low energy (BTLE)) and/or WiFi communications described herein may be handled by wireless communication subsystems 824. The specific design and implementation of the communication subsystems 824 may depend on the communication network(s) over which mobile device 110 may be intended to operate. For example, mobile device 110 may include communication subsystems 824 designed to operate over a GSM network, a GPRS network, an EDGE network, a WiFi or WiMax network, and a Bluetooth™ network. For example, the wireless communication subsystems 824 may include hosting protocols such that mobile device 110 can be configured as a base station for other wireless devices and/or to provide a WiFi service.

An audio subsystem 826 may be coupled to a speaker 828 and a microphone 830 to facilitate voice-enabled functions, such as speaker recognition, voice replication, digital recording, and telephony functions. The audio subsystem 826 may be configured to facilitate processing voice commands, voiceprinting, and voice authentication, for example.

The I/O subsystem 840 may include a touch-surface controller 842 and/or other input controller(s) 844. The touch-surface controller 842 may be coupled to a touch surface 846. The touch surface 846 and touch-surface controller 842 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of the speaker 828 and/or the microphone 830.

In some implementations, a pressing of the button for a first duration may disengage a lock of the touch surface 846; and a pressing of the button for a second duration that is longer than the first duration may turn power to mobile device 110 on or off. Pressing the button for a third duration may activate a voice control, or voice command, module that enables the user to speak commands into the microphone 830 to cause the device to execute the spoken command. The user may customize a functionality of one or more of the buttons. The touch surface 246 can, for example, also be used to implement virtual or soft buttons and/or a keyboard.

In some implementations, mobile device 110 may present recorded audio and/or video files, such as MP3, AAC, and MPEG files. In some implementations, mobile device 110 may include the functionality of an MP3 player, such as an iPod™. Mobile device 110 may, therefore, include a 36-pin connector and/or 8-pin connector that is compatible with the iPod. Other input/output and control devices may also be used.

The memory interface 802 may be coupled to memory 850. The memory 850 may include high-speed random access memory and/or non-volatile memory, such as one or more magnetic disk storage devices, one or more optical storage devices, and/or flash memory (e.g., NAND, NOR). The memory 850 may store an operating system 852, such as Darwin, RTXC, LINUX, UNIX, OS X, WINDOWS, or an embedded operating system such as VxWorks.

The operating system 852 may include instructions for handling basic system services and for performing hardware dependent tasks. In some implementations, the operating system 852 may be a kernel (e.g., UNIX kernel). In some implementations, the operating system 852 may include instructions for performing voice authentication.

The memory 850 may also store communication instructions 854 to facilitate communicating with one or more additional devices, one or more computers and/or one or more servers. The memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 may store mesh network instructions 872 to facilitate other processes and functions, such as performing mesh networking and/or check in/check out functions as described herein.

The memory 850 may also store other software instructions 874, such as web video instructions to facilitate web video-related processes and functions; and/or web shopping instructions to facilitate web shopping-related processes and functions. In some implementations, the media processing instructions 866 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 850 may include additional instructions or fewer instructions. Furthermore, various functions of mobile device 110 may be implemented in hardware and/or in software, including in one or more signal processing and/or application specific integrated circuits.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A mesh network based timekeeping method comprising:
receiving, by a transceiver of a mobile device, a beacon transmitted by a mesh network member mobile device;
extracting, by a processor of the mobile device, a crew ID from the beacon;
determining, by the processor, that the crew ID matches a crew ID of a user logged into the mobile device;
in response to determining that the crew ID matches the crew ID of the user, generating, by the processor, a reply beacon;
transmitting, by the transceiver, the reply beacon;
receiving, by the transceiver, a response to the reply beacon, the response including a job ID enabling the user to clock into a job;
clocking, by the processor, the user into the job, wherein as a result of clocking the user into the job, the mobile device becomes a member of the mesh network;
receiving, by the transceiver, a second beacon including different data from the crew ID from the mesh network member mobile device or a second mobile device;
retransmitting, by the transceiver, the second beacon; and
clocking, by the processor, the user out of the job;
wherein the clocking the user out of the job includes sending, by the processor, a message to a server device including at least a user ID from an account of the user logged into the mobile device, the job ID, and a time stamp.

2. The method of claim 1, wherein the reply beacon includes a user ID, the method further comprising determining, by the processor, the user ID from an account of the user logged into the mobile device.

3. The method of claim 1, wherein the clocking the user into the job includes sending, by the processor, a message to a server device including at least a user ID from an account of the user logged into the mobile device, the job ID, and a time stamp.

4. The method of claim 1, further comprising transmitting, by the transceiver, the beacon in response to becoming a member of the mesh network.

5. The method of claim 1, wherein as a result of clocking the user out of the job, the mobile device leaves the mesh network.

6. A mobile device configured to participate in a mesh network comprising:
a transceiver; and
a processor configured to:
receive, by the transceiver, a beacon transmitted by a mesh network member mobile device;
extract a crew ID from the beacon;
determine that the crew ID matches a crew ID of a user logged into the mobile device;
in response to determining that the crew ID matches the crew ID of the user, generate a reply beacon;
transmit, by the transceiver, the reply beacon;
receive, by the transceiver, a response to the reply beacon, the response including a job ID enabling the user to clock into a job;
clock the user into the job, wherein as a result of clocking the user into the job, the mobile device becomes a member of the mesh network, the processor being configured to clock the user into the job by sending a message to a server device including at least a user ID from an account of the user logged into the mobile device, the job ID, and a time stamp; and the processor is further configured to:
receive, by the transceiver, a second beacon including different data from the crew ID from a second mobile device; and
retransmit, by the transceiver, the second beacon.

7. The mobile device of claim 6, wherein the processor is further configured to:
generate a beacon including a crew ID associated with the user;
broadcasting, by the transceiver, the beacon including the crew ID associated with the user;
receive, by the transceiver, a response to the beacon including the crew ID associated with the user, the response including a user ID of an external user;
determine that the user ID of the external user is associated with the crew ID associated with the user;
transmit, by the transceiver, a job ID associated with the user enabling the external user to clock into a job associated with the user; and
receive, by the transceiver, and process at least one mesh network beacon from a mesh network mobile device into which the external user is logged in.

8. The mobile device of claim 6, wherein the processor is further configured to clock the user out of the job.

* * * * *